(12) United States Patent
Chung (10) Patent No.: US 11,453,994 B2
(45) Date of Patent: Sep. 27, 2022

(54) WORK EQUIPMENT SYSTEM AND CONTROL METHOD THEREFOR

(71) Applicant: Delta Electronics, Inc., Taoyuan (TW)

(72) Inventor: Chi-Wen Chung, Taoyuan (TW)

(73) Assignee: DELTA ELECTRONICS, INC, Taoyuan (TW)

(*) Notice: Subject to any disclaimer, the term of this patent is extended or adjusted under 35 U.S.C. 154(b) by 295 days.

(21) Appl. No.: 16/898,103

(22) Filed: Jun. 10, 2020

(65) Prior Publication Data

US 2021/0222394 A1    Jul. 22, 2021

Related U.S. Application Data

(60) Provisional application No. 62/961,910, filed on Jan. 16, 2020.

(51) Int. Cl.
| | | |
|---|---|---|
| *E02F 3/42* | (2006.01) | |
| *E02F 9/26* | (2006.01) | |
| *H02P 29/60* | (2016.01) | |

(52) U.S. Cl.
CPC ............... *E02F 3/42* (2013.01); *E02F 9/264* (2013.01); *H02P 29/60* (2016.02); *B60W 2300/17* (2013.01)

(58) Field of Classification Search
CPC . E02F 3/42; E02F 9/264; H02P 29/60; B60W 2300/17
USPC ................................... 318/608, 641, 400.08
See application file for complete search history.

(56) References Cited

U.S. PATENT DOCUMENTS

| | | | |
|---|---|---|---|
| 6,992,452 B1* | 1/2006 | Sachs ................... | H02P 29/032 318/434 |
| 2008/0024080 A1* | 1/2008 | Ogawa ................ | B62D 5/0496 318/432 |
| 2013/0176649 A1* | 7/2013 | Wallis ................... | H02H 3/006 361/31 |
| 2014/0118866 A1 | 5/2014 | Iwami et al. | |

(Continued)

FOREIGN PATENT DOCUMENTS

| | | | | |
|---|---|---|---|---|
| CN | 103802883 A | | 5/2014 | |
| CN | 105915141 A | * | 8/2016 | ............ H02P 21/141 |
| CN | 106168512 A | * | 11/2016 | ............ H02K 11/25 |

(Continued)

*Primary Examiner* — Jorge L Carrasquillo
(74) *Attorney, Agent, or Firm* — Kirton McConkie; Evan R. Witt (57) ABSTRACT

The present disclosure provides a work equipment system and a control method therefor. The work equipment system includes a work equipment, a temperature sensor and a controller. The work equipment includes a motor device, and the motor device is configured to provide a motive power to a load device. The temperature sensor is configured to measure a motor temperature. The controller is configured to: calculate a first current based on a required motive power command and electrical parameters; calculate a temperature difference between the motor temperature and a preset temperature; calculate a thermal power based on the temperature difference and a thermal resistance; calculate a second current based on the thermal power and the motor resistance; and compare the second current to an effective value of the first current for determining whether the second current is smaller than the first current.

17 Claims, 9 Drawing Sheets

(56) References Cited

U.S. PATENT DOCUMENTS

2019/0077441 A1   3/2019   Sakashita

FOREIGN PATENT DOCUMENTS

| | | | | |
|---|---|---|---|---|
| JP | 2007026700 A | | 2/2007 | |
| JP | 2007112188 A | | 5/2007 | |
| JP | 2010110141 A | * | 5/2010 | ............. B60L 11/14 |
| JP | 2014093832 A | | 5/2014 | |
| JP | 2014147193 A | | 8/2014 | |
| JP | 2018093596 A | * | 6/2018 | ............... B60K 6/46 |
| TW | 201340581 A | | 10/2013 | |

\* cited by examiner

WORK EQUIPMENT SYSTEM AND CONTROL METHOD THEREFOR

CROSS-REFERENCE TO RELATED APPLICATION

This application claims the benefit of U.S. Provisional Application No. 62/961,910 filed on Jan. 16, 2020, and entitled "TEMPERATURE CONTROL FOR EQUIPMENT", the entire contents of which are incorporated herein by reference for all purposes.

FIELD OF THE INVENTION

The present disclosure relates to a work equipment system and a control method therefor, and more particularly to a work equipment system and a control method therefor which are capable of providing the target motive power and the required temperature simultaneously.

BACKGROUND OF THE INVENTION

Generally, the electric motor, which is usually placed in a work equipment, is configured to provide the main motive power for operating the work equipment. Since the conversion efficiency between electric energy and kinetic energy in the electric motor is not 100%, the process of generating the motive power has heat loss that is in the form of the thermal energy. In addition, the motion of the mechanism elements used for transmission and guidance also induces the heat loss in the form of the thermal energy because of friction. Consequently, the thermal energy mentioned above increases the temperature of work equipment so that the work equipment might be damaged. In addition, with the developing of the automation, the demand for the mechanical accuracy becomes higher and higher. When the temperature of work equipment varies greatly, the mechanical accuracy would be affected due to thermal expansion and contraction. Therefore, it is important to keep the temperature of work equipment in a consistent range of operation temperature.

Conventionally, a cooling device (e.g., water-cooling, oil-cooling or gas-cooling device) is disposed for cooling the work equipment system, so as to control the temperature of work equipment. However, when the required motive power and the moving speed of work equipment are varied, the generated thermal energy is varied accordingly. Namely, the thermal energy generated by the electric motor is not a fixed value. Therefore, it is hard to stabilize the operation temperature of work equipment by using the cooling device simply. Moreover, for reducing the production cost and saving the working space, some work equipments are designed without cooling device. It is difficult for the work equipment without cooling device to stabilize the operation temperature when the temperature of equipment is lower than a preset temperature (e.g., when the thermal energy generated by the electric motor is decreased, when the temperature of cooling fluid is too low, or when the environmental temperature is decreased). In addition, when the work equipment is started initially, the work equipment has to carry out a warm-up operation, and the work equipment cannot work for production during the warm-up operation. When the environment temperature is low, the time for the warm-up operation is even longer. Consequently, the work efficiency of work equipment is reduced, and even the lifespan of work equipment is decreased due to wear and tear.

Therefore, there is a need of providing a work equipment system and a control method therefor to obviate the drawbacks encountered from the prior arts.

SUMMARY OF THE INVENTION

It is an objective of the present disclosure to provide a work equipment system and a control method therefor. Through controlling the current of the motor device of the work equipment, the work equipment is able to satisfy the motive power and temperature requirements simultaneously. Meanwhile, the temperature of the work equipment is controlled stably. Therefore, the mechanical accuracy of the work equipment can be maintained. Moreover, the time for warm-up operation is shortened, which increases the work efficiency and lifespan of the work equipment.

In accordance with an aspect of the present disclosure, there is provided a work equipment system. The work equipment system includes a work equipment, a temperature sensor and a controller. The work equipment includes a motor device, and the motor device is configured to provide a motive power to a load device. The temperature sensor is configured to measure a motor temperature of the motor device. The controller includes a preset temperature, a motor resistance of the motor device, a thermal resistance of the work equipment system and electrical parameters. When the controller receives a required motive power command, the controller is configured to: calculate a first current based on the required motive power command and the electrical parameters; calculate a temperature difference between the motor temperature and the preset temperature; calculate a thermal power based on the temperature difference and the thermal resistance; calculate a second current based on the thermal power and the motor resistance; and compare the second current to an effective value of the first current for determining whether the second current is smaller than the first current. The controller controls the motor device to reduce the motive power if the controller identifies that the second current is smaller than the first current.

In accordance with an aspect of the present disclosure, there is further provided a control method for a work equipment system. The work equipment system includes a motor device providing a motive power to a load device, a temperature sensor measuring a motor temperature of the motor device and a controller including a preset temperature, a motor resistance of the motor device, a thermal resistance of the work equipment system and electrical parameters. When the controller receives a required motive power command, the controller performs the control method comprising steps of: (a) calculating a first current based on the required motive power command and the electrical parameters; (b) calculating a temperature difference between the motor temperature and the preset temperature; (c) calculating a thermal power based on the temperature difference and the thermal resistance; (d) calculating a second current based on the thermal power and the motor resistance; and (e) comparing the second current to an effective value of the first current for determining whether the second current is smaller than the first current. If the controller identifies that the second current is not smaller than the first current, the controller performs the control method further comprising steps of: (f) calculating a current phase difference based on a ratio value of the effective value and the second current; (g) calculating a target current phase based on a phase angle of the required motive power command and the current phase difference; (h) calculating a target motive power based on the second current, the target current phase and the electrical parameters; and (i) controlling the motor device to adjust the motive power which is close to the target motive power within an error range.

In accordance with an aspect of the present disclosure, there is further provided a work equipment system. The work equipment system includes a motor device, a temperature sensor, a controller and a cooling device. The motor device is configured to provide a motive power to a load device. The temperature sensor is configured to measure a motor temperature of the motor device. The controller includes a preset temperature, a motor resistance of the motor device, a thermal resistance of the work equipment system and electrical parameters. The cooling device is coupled to the motor device and the controller. When the controller receives a required motive power command, the controller is configured to: calculate a first current based on the required motive power command and the electrical parameters; calculate a temperature difference between the motor temperature and the preset temperature; calculate a thermal power based on the temperature difference and the thermal resistance; calculate a second current based on the thermal power and the motor resistance; and compare the second current to an effective value of the first current for determining whether the second current is smaller than the first current. When the controller identifies that the second current is smaller than the first current, the controller enables the cooling device.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
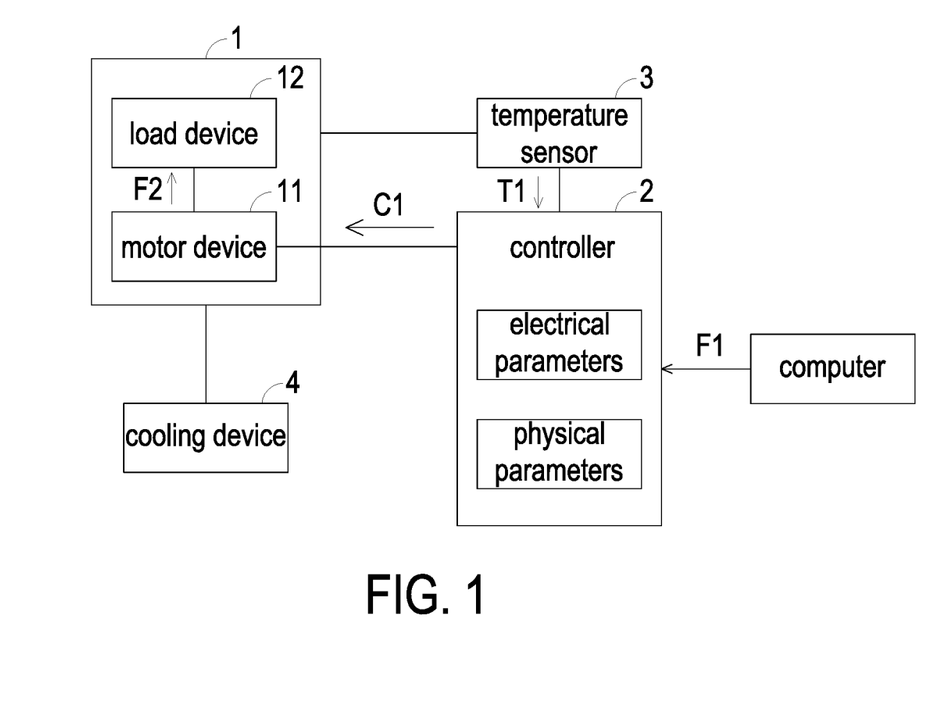
FIG. 1 is a schematic block diagram illustrating a work equipment system according to an embodiment of the present disclosure.

FIG. 1 is a schematic block diagram illustrating a work equipment system according to an embodiment of the present disclosure. As shown in FIG. 1, a work equipment system of the present disclosure includes a work equipment 1, a controller 2 and a temperature sensor 3. The work equipment 1 includes a motor device 11, and the motor device 11 is configured to provide a motive power F2 to a load device 12. In other some embodiments, the load device 12 can be placed inside or outside of the work equipment 1, and the present invention is not limited thereto. The temperature sensor 3, coupled to the work equipment 1, is configured to measure a motor temperature T1 of the motor device 11. In some embodiments, because the main thermal energy is usually generated by the motor device 11, the motor temperature T1 can represent the current working temperature of the work equipment 1. However, the present invention is not limited thereto. The controller 2 is coupled to the motor device 11 of the work equipment 1 and the temperature sensor 3. In FIG. 1, the controller 2 includes physical parameters and electrical parameters. The electrical parameters are for example but not limited to include a magnetic field value of the motor device 11 and a phase angle of loadstones of the motor device 11, and the physical parameters include a preset temperature, a motor resistance of the motor device 11 and a thermal resistance of the work equipment system.

In an embodiment, the controller 2 is coupled to a computer, which is configured to provide a required motive power command F1. When the controller 2 receives the required motive power command F1, the controller 2 is configured to: calculate a first current based on the required motive power command F1 and the electrical parameters; calculate a temperature difference between the motor temperature T1 and the preset temperature; calculate a thermal power based on the temperature difference and the thermal resistance; calculate a second current based on the thermal power and the motor resistance; and compare the second current to an effective value of the first current (e.g., the effective value can be a root-mean-square value of the first current, an absolute value of the first current or an average value of the first current, but the present invention is not limited thereto.) for determining whether the second current is smaller than the first current. If the second current is smaller than the effective value of the first current, it means that the second current is smaller than the first current. If the second current is larger than or equal to the effective value of the first current, it means that the second current is not smaller than the first current.

If the controller 2 identifies that the second current is smaller than the first current, the controller 2 controls the motor device 11 to reduce the motive power F2. Alternatively, if the controller 2 identifies that the second current is not smaller than the first current, the controller 2 is further configured to: calculate a current phase difference based on a ratio value of the effective value of the first current and the second current; calculate a target current phase based on a phase angle of the required motive power command F1 and the current phase difference; calculate a target motive power based on the second current, the target current phase and the electrical parameters; and control the motor device 11 to adjust the motive power F2 which is close to the target motive power within an error range (e.g., the error range between the motive power F2 and the target motive power is about 0~10%, but the present invention is not limited thereto).

Consequently, the motive power F2 provided to the load device 12 is adjusted to be close to the target motive power, and thus the motive power requirement of the work equipment 1. In addition, through satisfying the thermal power requirement of the work equipment 1, the temperature of the work equipment 1 is controlled stably, namely the temperature requirement of the work equipment 1 is satisfied as well. Accordingly, the mechanical accuracy of the work equipment 1 can be maintained at a high level.

Figure 2:
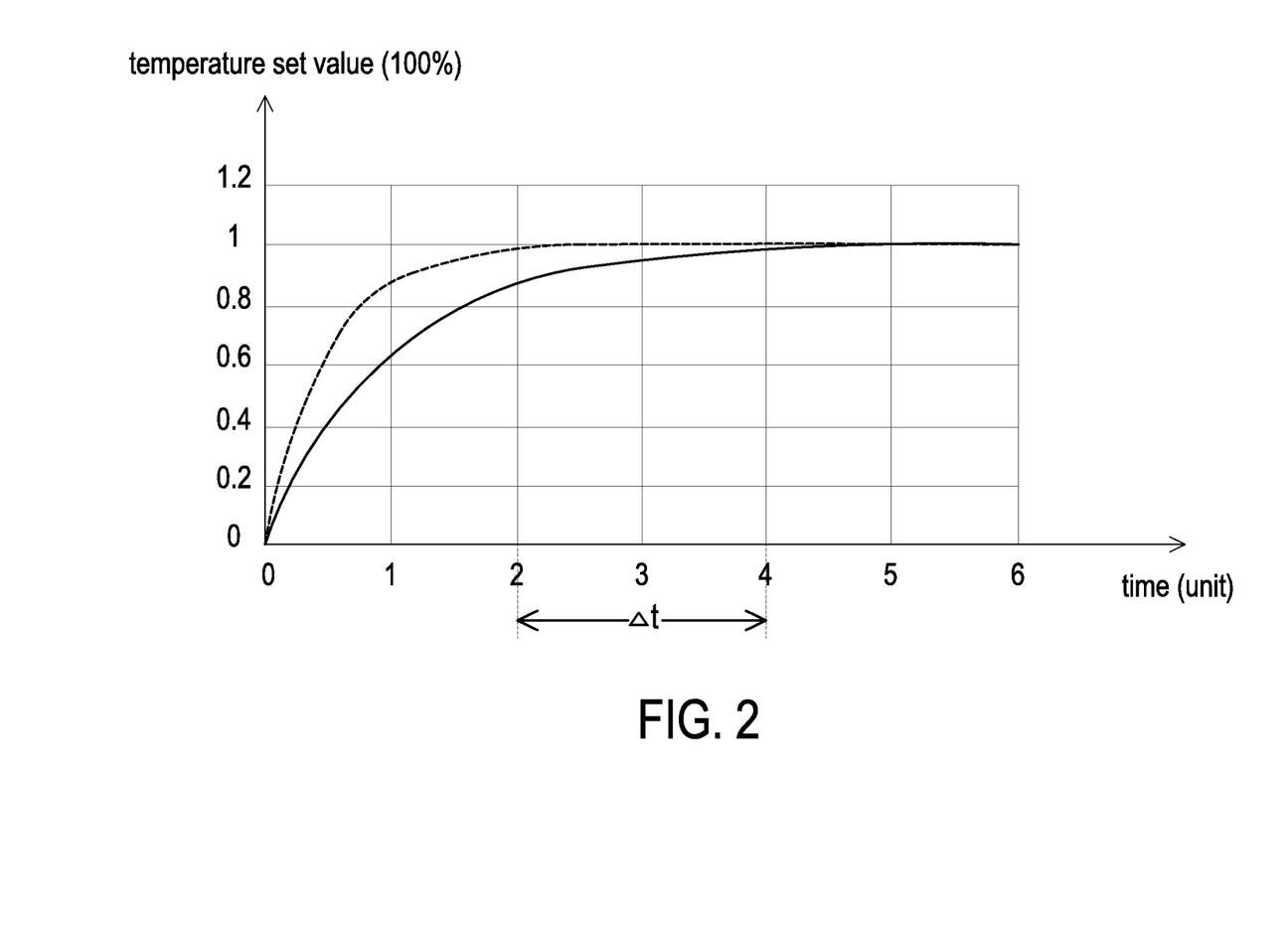
FIG. 2 is a schematic view showing the temperature variation curves of the prior work equipment and the work equipment of FIG. 1 during the warm-up operation.

Please refer to FIG. 1 and FIG. 2 together. Moreover, according to the temperature variation curve during the warm-up operation shown in FIG. 2, the time for warm-up operation of the work equipment 1 of the present disclosure is shortened in comparison with the time for warm-up operation of the prior work equipment. In FIG. 2, the temperature variation curve of the prior work equipment is depicted by solid line, and the temperature variation curve of the work equipment 1 is depicted by dashed line. By utilizing the work equipment 1 of the present disclosure, the time for warm-up operation is shortened by $\Delta t$. Meanwhile, the work efficiency and lifespan of the work equipment are increased as well.

Please refer to FIG. 1 again. The electrical and physical parameters are preset in the firmware or software program in the controller 2, but the present invention is not limited thereto. In an embodiment, the user can make use of computer to provide the required motive power command F1 to the controller 2. In an embodiment, the work equipment 1 further includes a cooling device 4. The cooling device 4 is coupled to the work equipment 1. The cooling device 4 is configured to reduce the motor temperature T1. Consequently, the controller 2 may control the motor device 11 by taking the affection of the cooling device 4 into consideration, and thus the motor temperature T1 can be kept consistent.

Figure 3:
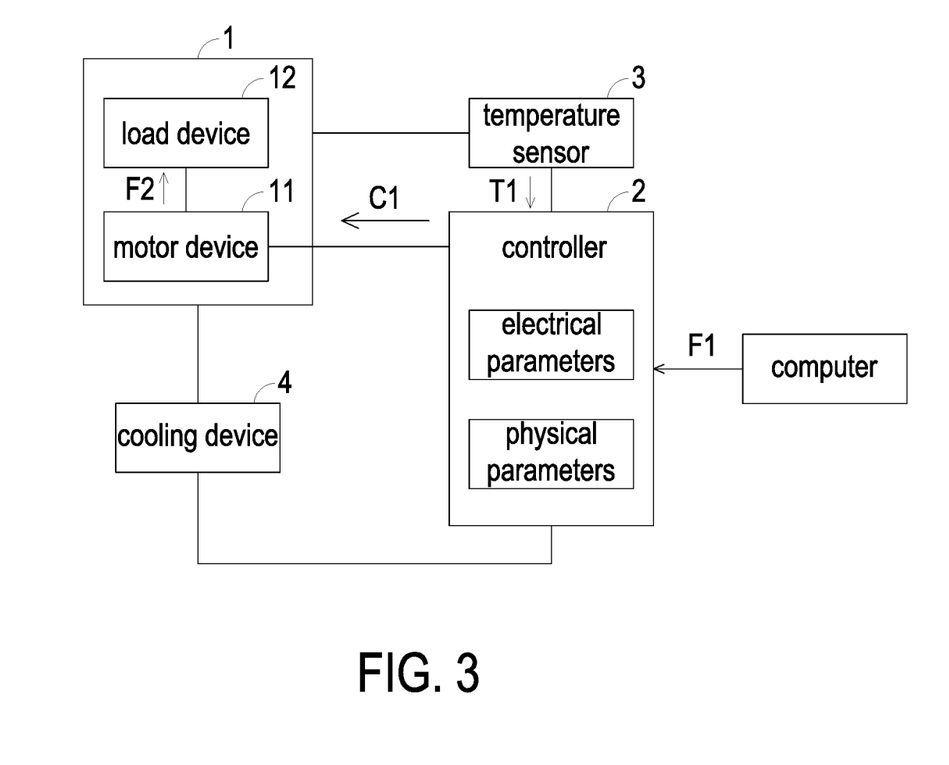
FIG. 3 is a schematic block diagram illustrating a variation of the work equipment system of FIG. 1.

In an embodiment, as shown in FIG. 3, the cooling device 4 is further coupled to the controller 2. The controller 2 outputs a temperature control command to enable or disable the cooling device 4. When the controller 2 identifies that the second current is smaller than the first current, the controller 2 enables the cooling device 4. In this circumstance, it means that the required motive power command F1 output by the computer causes the motor device 11 to provide too much motive power F2. Consequently, the operation of the motor device 11 would produce a large amount of thermal energy, so the cooling device 4 must be enabled to reduce the thermal energy. As the cooling device 4 is enabled, the motor temperature T1 is reduced, which causes the temperature difference, the thermal power and the second current to increase. Under this circumstance, when the controller 2 identifies that the second current is not smaller than the first current, the controller 2 disables the cooling device 4. Since the controller 2 is able to adjust the motor temperature T1 through controlling the operation of the motor device 11 and the cooling device 4, the motor temperature T1 can be controlled more accurately.

The above-mentioned calculation process performed by the controller 2 is exemplified as follows.

The controller 2 calculates the first current $i_1$ based on the required motive power command F1 and the electrical parameters by equation (1), $$i_1 = F1/[\sin(\theta_{i1}) \times B \sin(\theta_b)] \quad (1),$$

where $\theta_{i1}$ is the phase angle of the first current included in the required motive power command F1, B is the magnetic field value of the motor device 11, and $\theta_b$ is the phase angle of loadstones of the motor device 11. The phase angle $\theta_{i1}$ is equal to the phase angle $\theta_b$.

The controller 2 calculates the temperature difference between the motor temperature T1 and the preset temperature. Based on the temperature difference and the thermal resistance of the work equipment system, the controller 2 calculates the thermal power by equation (2), $$P_{thermal} = \Delta T/R_{th} \quad (2),$$

where $P_{thermal}$ is the thermal power, $\Delta T$ is the temperature difference, and $R_{th}$ is the thermal resistance of the work equipment system.

Based on the thermal power $P_{thermal}$ and the motor resistance, the controller 2 calculates the second current $i_2$ by equation (3), $$i_2 = (P_{thermal}/R)^{0.5} \quad (3),$$

where R is the motor resistance of the motor device 11.

If the controller 2 identifies that the second current is not smaller than the first current, the controller 2 calculates the current phase difference $\theta_{id}$ based on a ratio value of the effective value $i_{1e}$ of the first current $i_1$ and the second current $i_2$ through equation (4). Therefore, the controller 2 calculates the target current phase $\theta_{target}$ based on the phase angle $\theta_{i1}$ and the current phase difference $\theta_{id}$ through equation (5).

$$\theta_{id} = \cos^{-1}(i_{1e}/i_2) \quad (4)$$

$$\theta_{target} = \theta_{i1} - \theta_{id} \quad (5)$$

Based on the second current $i_2$, the target current phase $\theta_{target}$ and the electrical parameters, the controller 2 calculates a target motive power F3 by equation (6).

$$F3 = i_2 \times [\sin(\theta_{target}) \times B \sin(\theta_b)] \quad (6)$$

Please refer to FIG. 1 and FIG. 3. The controller 2 outputs the control signal C1 to the motor device 11 based on the target motive power F3, shown as equation (6). Accordingly, the controller 2 controls the motor device 11 to adjust the motive power F2 to be close to the target motive power F3 within an error range. Consequently, the controller 2 controls the motor device 11 to operate with the second current $i_2$ and the target current phase $\theta_{target}$. The motive power requirements are satisfied. Meanwhile, the thermal power generated by the motor device 11 is equal to the thermal power $P_{thermal}$. Consequently, the thermal power requirements are satisfied simultaneously.

Figure 4:
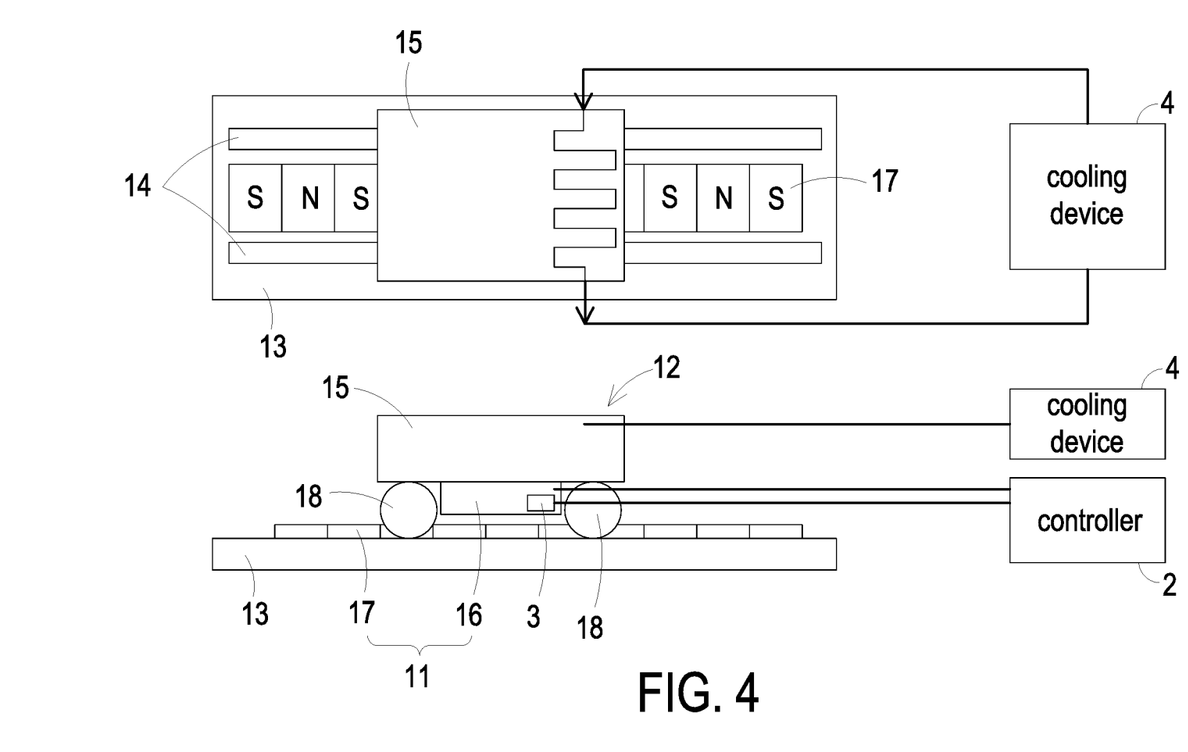
FIG. 4 schematically shows the side and top views of the work equipment system, wherein the work equipment of the work equipment system is a movable carrier.
Figure 5:
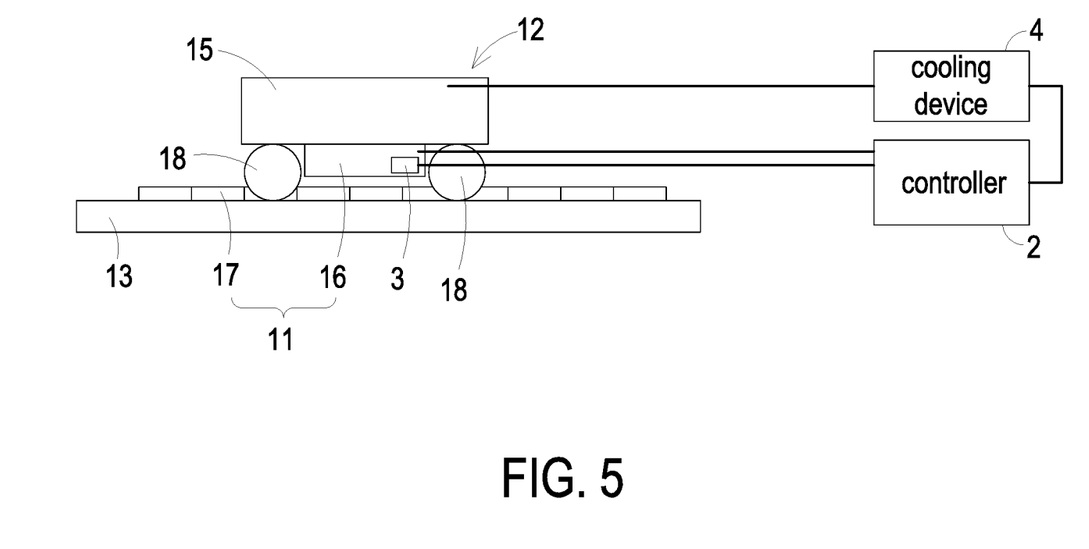
FIG. 5 schematically shows the side view of a variation of the work equipment system of FIG. 4.

The actual type of the work equipment 1 of the present disclosure is not limited. The work equipment 1 can be any kind of equipment. For example, as shown in FIG. 4, the work equipment 1 is a movable carrier. In this embodiment, the work equipment 1 includes the motor device 11, the load device 12 and a mounting surface 13, and a slide 14 is disposed on the mounting surface 13. The load device 12 includes a work platform 15 and a pulley 18 coupled to each other. Through the coupling between the pulley 18 and the slide 14, the load device 12 is allowed to move on the mounting surface 13 along the slide 14. The motor device 11 includes a winding assembly 16 and a magnet stator 17 electromagnetically coupled to each other. The winding assembly 16 is disposed on the work platform 15. The magnet stator 17 is disposed on the mounting surface 13 along the slide 14. In an embodiment, the work equipment system further includes a temperature sensor 3 and a cooling device 4. The temperature sensor 3 is coupled to the work equipment 1 and the controller 2, and the temperature sensor 3 is for example but not limited to be disposed within the motor device 11. The cooling device 4 is coupled to the work equipment 1. The operations and connection relations of the motor device 11, the load device 12, the temperature sensor 3, the cooling device 4 and the controller 2 are the same with that described above, and thus the detailed descriptions thereof are omitted herein. In addition, in an embodiment, as shown in FIG. 5, the cooling device 4 is further coupled to the controller, and the cooling device 4 is controlled by the temperature control command from the controller 2.

Figure 6A:
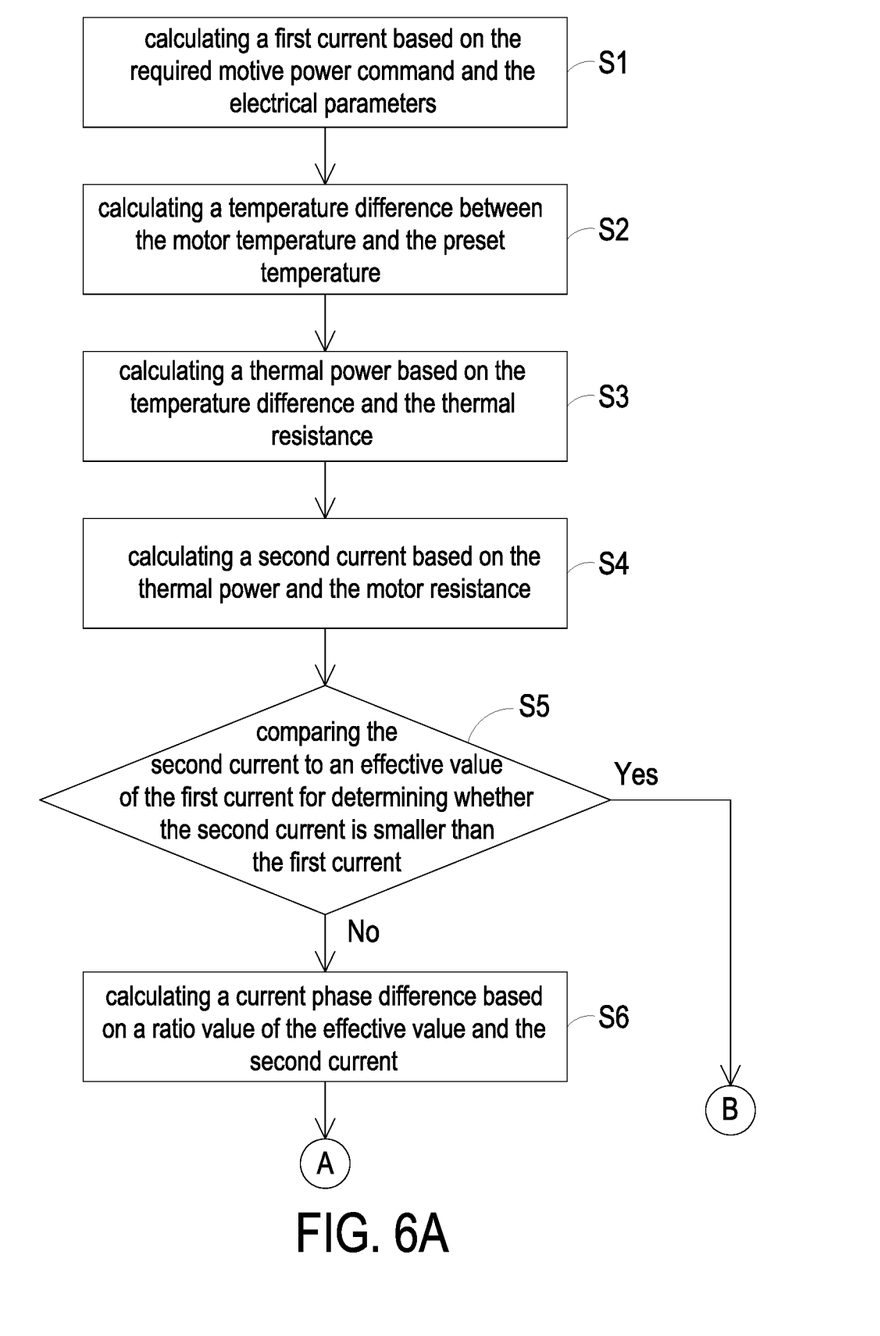
FIGS. 6A and 6B are schematic flowcharts illustrating a control method for a work equipment system according to an embodiment of the present disclosure.
Figure 6B:
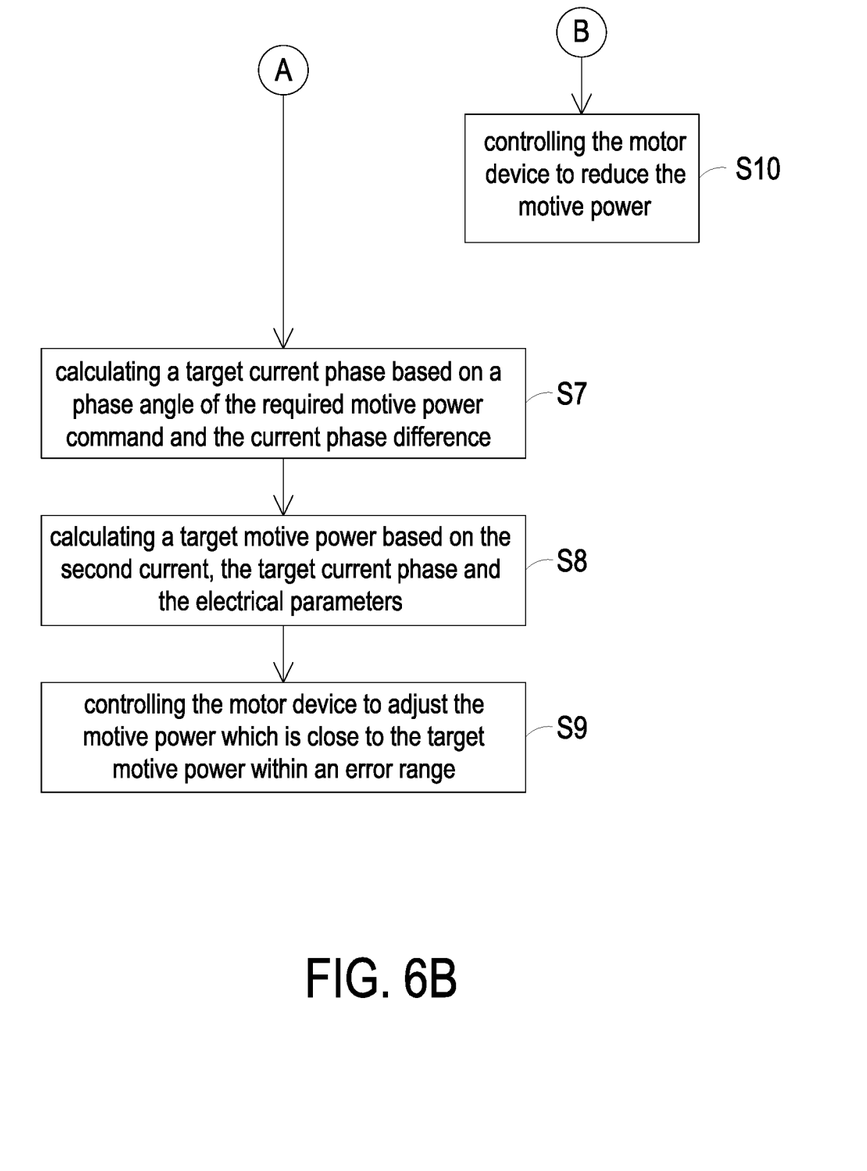

FIGS. 6A and 6B are schematic flowcharts illustrating a control method for a work equipment system according to an embodiment of the present disclosure. The control method is configured to control the work equipment system shown in above embodiments, and the control method is performed by the controller 2. As shown in FIGS. 6A and 6B, the control method includes the following steps.

In step S1, calculating a first current based on the required motive power command F1 and the electrical parameters.

In step S2, calculating a temperature difference between the motor temperature T1 and the preset temperature.

In step S3, calculating a thermal power based on the temperature difference and the thermal resistance.

In step S4, calculating a second current based on the thermal power and the motor resistance.

In step S5, comparing the second current to an effective value of the first current for determining whether the second current is smaller than the first current. If the second current is smaller than the effective value of the first current, it means that the second current is smaller than the first current. If the second current is larger than or equal to the effective value of the first current, it means that the second current is not smaller than the first current.

If the controller 2 identifies that the second current is not smaller than the first current, the controller 2 performs the control method further including steps S6, S7, S8 and S9. In step S6, calculating a current phase difference based on a ratio value of the effective value and the second current. In step S7, calculating a target current phase based on a phase angle of the required motive power command F1 and the current phase difference. In step S8, calculating a target motive power based on the second current, the target current phase and the electrical parameters. In step S9, controlling the motor device to adjust the motive power F2 which is close to the target motive power within an error range.

Figure 7A:
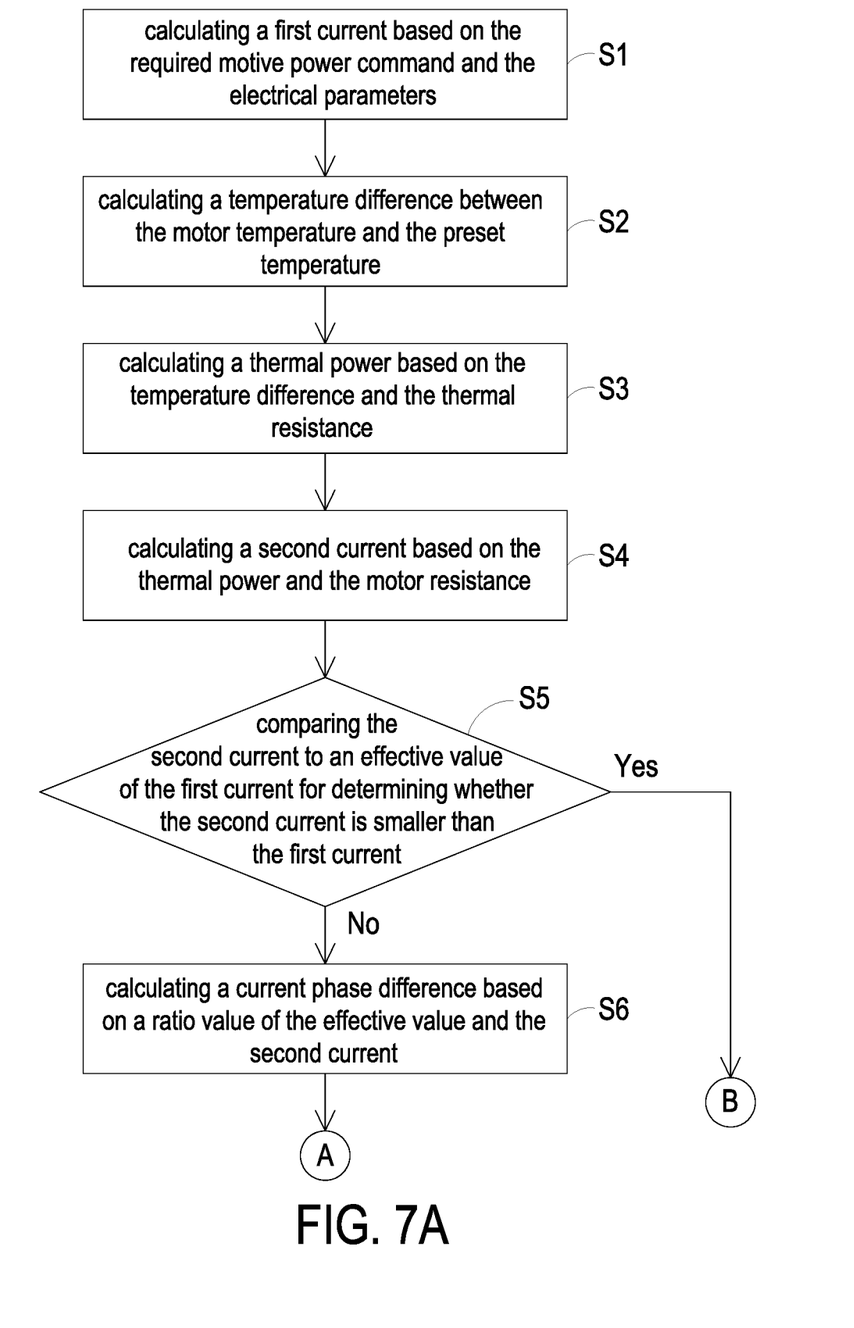
FIGS. 7A and 7B are schematic flowcharts illustrating a variation of the control method of FIGS. 6A and 6B.
Figure 7B:
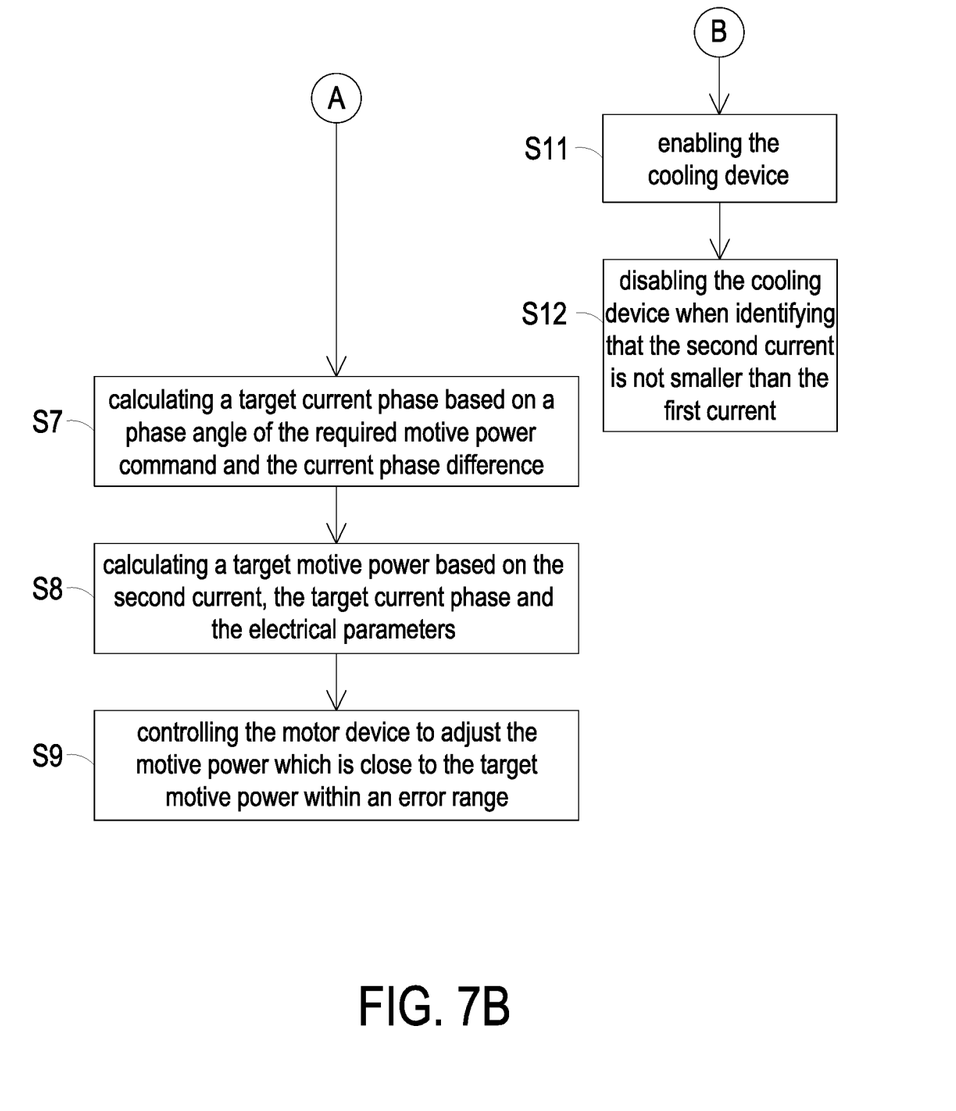

If the controller 2 identifies that the second current is smaller than the first current, the controller 2 controls the motor device 11 to reduce the motive power F2 (see step S10). Alternatively, as shown in FIGS. 7A and 7B, under the circumstance that the work equipment system includes a cooling device 4 coupled to the work equipment 1 and the controller 2, the controller 2 enables the cooling device 4 when the controller 2 identifies that the second current is smaller than the first current (see step S11). Further, as the cooling device 4 enabled for a while, the controller 2 disables the cooling device 4 when the controller 2 identifies that the second current is not smaller than the first current (see step S12).

From the above descriptions, the present disclosure provides a work equipment system and a control method therefor. Through controlling the current of the motor device of the work equipment, the work equipment is able to satisfy the motive power and temperature requirements simultaneously. Meanwhile, the temperature of the work equipment is controlled stably. Therefore, the mechanical accuracy of the work equipment can be maintained. Moreover, the time for warm-up operation is shortened, which increases the work efficiency and lifespan of the work equipment.

While the disclosure has been described in terms of what is presently considered to be the most practical and preferred embodiments, it is to be understood that the disclosure needs not be limited to the disclosed embodiment.

What is claimed is:

1. A work equipment system, comprising:
 a work equipment, comprising a motor device, wherein the motor device is configured to provide a motive power to a load device;
 a temperature sensor, configured to measure a motor temperature of the motor device; and
 a controller, comprising a preset temperature, a motor resistance of the motor device, a thermal resistance of the work equipment system and electrical parameters;
 wherein when the controller receives a required motive power command, the controller is configured to:
 calculate a first current based on the required motive power command and the electrical parameters;
 calculate a temperature difference between the motor temperature and the preset temperature;
 calculate a thermal power based on the temperature difference and the thermal resistance;
 calculate a second current based on the thermal power and the motor resistance; and
 compare the second current to an effective value of the first current for determining whether the second current is smaller than the first current, wherein the controller controls the motor device to reduce the motive power if the controller identifies that the second current is smaller than the first current,
 wherein if the controller identifies that the second current is not smaller than the first current, the controller calculates a current phase difference based on a ratio value of the effective value and the second current.

2. The work equipment system according to claim 1, wherein if the controller identifies that the second current is not smaller than the first current, the controller is further configured to:
 calculate a target current phase based on a phase angle of the required motive power command and the current phase difference;
 calculate a target motive power based on the second current, the target current phase and the electrical parameters; and
 control the motor device to adjust the motive power which is close to the target motive power within an error range.

3. The work equipment system according to claim 2, wherein the electrical parameters comprises a magnetic field value of the motor device and a phase angle of loadstones of the motor device.

4. The work equipment system according to claim 2, wherein the error range is 0~10%.

5. The work equipment system according to claim 1, wherein the effective value of the first current can be a root-mean-square value of the first current, an absolute value of the first current or an average value of the first current.

6. The work equipment system according to claim 1, further comprising a cooling device coupled to the work equipment and the controller.

7. The work equipment system according to claim 6, wherein when the controller identifies that the second current is smaller than the first current, the controller enables the cooling device.

8. The work equipment system according to claim 7, wherein when the controller identifies that the second current is not smaller than the first current, the controller disables the cooling device.

9. A control method for a work equipment system, wherein the work equipment system comprises a motor device providing a motive power to a load device, a temperature sensor measuring a motor temperature of the motor device and a controller comprising a preset temperature, a motor resistance of the motor device, a thermal resistance of the work equipment system and electrical parameters, wherein when the controller receives a required motive power command, the controller performs the control method comprising steps of:
(a) calculating a first current based on the required motive power command and the electrical parameters;
(b) calculating a temperature difference between the motor temperature and the preset temperature;
(c) calculating a thermal power based on the temperature difference and the thermal resistance;
(d) calculating a second current based on the thermal power and the motor resistance; and
(e) comparing the second current to an effective value of the first current for determining whether the second current is smaller than the first current,
wherein if the controller identifies that the second current is not smaller than the first current, the controller performs the control method further comprising steps of:
(f) calculating a current phase difference based on a ratio value of the effective value and the second current;
(g) calculating a target current phase based on a phase angle of the required motive power command and the current phase difference;
(h) calculating a target motive power based on the second current, the target current phase and the electrical parameters; and
(i) controlling the motor device to adjust the motive power which is close to the target motive power within an error range.

10. The control method according to claim 9, wherein the electrical parameters comprises a magnetic field value of the motor device and a phase angle of loadstones of the motor device.

11. The control method according to claim 9, wherein the error range is 0~10%.

12. The control method according to claim 9, wherein the effective value of the first current can be a root-mean-square value of the first current, an absolute value of the first current or an average value of the first current.

13. The control method according to claim 9, wherein if the controller identifies the second current is smaller than the first current, the controller controls the motor device to reduce the motive power.

14. The control method according to claim 9, wherein the work equipment system further comprising a cooling device coupled to the work equipment and the controller.

15. The control method according to claim 14, wherein when the controller identifies that the second current is smaller than the first current, the controller enables the cooling device.

16. The control method according to claim 15, wherein when the controller identifies that the second current is not smaller than the first current, the controller disables the cooling device.

17. A work equipment system, comprising:
a motor device, configured to provide a motive power to a load device;
a temperature sensor, configured to measure a motor temperature of the motor device;
a controller, comprising a preset temperature, a motor resistance of the motor device, a thermal resistance of the work equipment system and electrical parameters; and
a cooling device, coupled to the motor device and the controller;
wherein when the controller receives a required motive power command, the controller is configured to:
calculate a first current based on the required motive power command and the electrical parameters;
calculate a temperature difference between the motor temperature and the preset temperature;
calculate a thermal power based on the temperature difference and the thermal resistance;
calculate a second current based on the thermal power and the motor resistance; and
compare the second current to an effective value of the first current for determining whether the second current is smaller than the first current;
wherein when the controller identifies that the second current is smaller than the first current, the controller enables the cooling device,
wherein when the controller identifies that the second current is not smaller than the first current, the controller disables the cooling device.

* * * * *